(12) United States Patent
Zaric

(10) Patent No.: US 10,680,348 B2
(45) Date of Patent: Jun. 9, 2020

(54) MULTI ANTENNA FOR RAIL APPLICATIONS AND METHODS

(71) Applicant: TAOGLAS GROUP HOLDINGS LIMITED, Enniscorthy, County Wexford (IE)

(72) Inventor: Andela Zaric, Munich (DE)

(73) Assignee: TAOGLAS GROUP HOLDINGS LIMITED, Enniscorthy, County Wexford (IE)

( * ) Notice: Subject to any disclaimer, the term of this patent is extended or adjusted under 35 U.S.C. 154(b) by 164 days.

(21) Appl. No.: 15/695,569

(22) Filed: Sep. 5, 2017

(65) Prior Publication Data

US 2018/0083369 A1 Mar. 22, 2018

Related U.S. Application Data

(60) Provisional application No. 62/395,779, filed on Sep. 16, 2016.

(51) Int. Cl.

| | | |
|---|---|---|
| *H01Q 21/28* | (2006.01) |
| *H01Q 1/52* | (2006.01) |
| *H01Q 1/12* | (2006.01) |
| *H01Q 1/32* | (2006.01) |
| *H01Q 1/42* | (2006.01) |
| *H04B 7/02* | (2018.01) |

(52) U.S. Cl.
CPC ............ *H01Q 21/28* (2013.01); *H01Q 1/125* (2013.01); *H01Q 1/32* (2013.01); *H01Q 1/42* (2013.01); *H01Q 1/521* (2013.01); *H04B 7/02* (2013.01); *H01Q 1/1207* (2013.01)

(58) Field of Classification Search
CPC ............ H01Q 21/28; H01Q 1/12; H01Q 1/32; H01Q 1/42; H01Q 1/52; H04B 7/02
USPC ........................................................ 343/713
See application file for complete search history.

(56) References Cited

U.S. PATENT DOCUMENTS

| | | | |
|---|---|---|---|
| 7,786,937 B1 | 8/2010 | Stierhoff et al. |
| 2003/0080257 A1 | 5/2003 | Harris et al. |
| 2009/0160729 A1 | 6/2009 | Hunt et al. |
| 2010/0315301 A1 | 12/2010 | Marten et al. |
| 2012/0081253 A1* | 4/2012 | Duzdar ................. H01Q 21/28 343/713 |
| 2015/0071137 A1* | 3/2015 | Thiam ................. H01Q 9/0407 370/297 |

FOREIGN PATENT DOCUMENTS

| | | |
|---|---|---|
| EP | 1908147 B1 | 8/2015 |
| JP | 2003347838 A | 12/2003 |

(Continued)

OTHER PUBLICATIONS

Huber + Suhner, Train to Ground Communication, 2015.

(Continued)

*Primary Examiner* — Andrea Lindgren Baltzell
(74) *Attorney, Agent, or Firm* — Knobbe Martens Olson & Bear LLP

(57) ABSTRACT

Disclosed is a 7 in 1 antenna configuration which includes 4 LTE antennas, two Wi-Fi antennas and a GPS/GLONASS/BeiDou patch antenna solution. Four standard M10 holes that allow for easy retro-fit into existing installation holes that may be present. Methods of communicating using a 7 in 1 antenna are also provided.

20 Claims, 6 Drawing Sheets

(56) References Cited

FOREIGN PATENT DOCUMENTS

| KR | 101622170 B1 | 5/2016 |
|---|---|---|
| WO | 1999066595 A1 | 12/1999 |

OTHER PUBLICATIONS

TE Connectivity, MiMo Rooftop Antenna, Jul. 9, 2016.
Mimo Rooftop Antenna Data Sheet, TE Connectivity, 2016.
Product Data Sheet Train Antenna (Tetra TRNBG), Panorama Antennas, Issue 2, Jun. 17, 2011.
SENCITY® Rail MIMO Roof-top antenna for trains, Huber+Suhner, https://literature/hubersuhner.com/Technologies/Radiofrequency/SENCITYRail MIMOEN/, accessed Sep. 8, 2017.
Train Antenna 1710-3800 MHz, Kathrein, accessed Sep. 8, 2017.
Train Antenna 410-470 MHz, Kathrein, accessed Sep. 8, 2017.
Train Antenna 790-2700 MHz, Kathrein, accessed Sep. 8, 2017.
Train-to-ground communication, Huber+Suhner, Dec. 2015.

\* cited by examiner

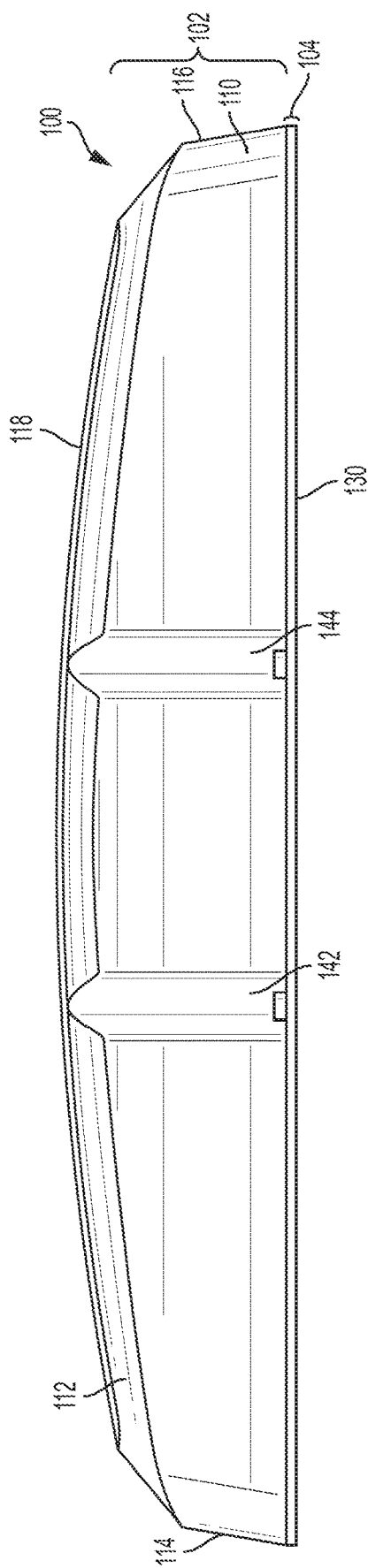
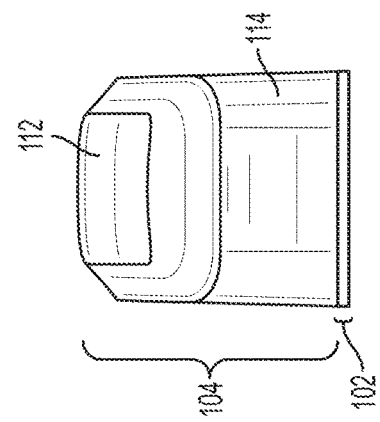

MULTI ANTENNA FOR RAIL APPLICATIONS AND METHODS

CROSS-REFERENCE

This application claims the benefit of U.S. Provisional Application No. 62/395,779, filed Sep. 16, 2016, entitled Multi Antenna for Rail Applications, which application is incorporated herein by reference.

BACKGROUND

Field of Invention

This disclosure is directed to antenna assemblies, particularly assemblies suitable for use in the transportation field with trains, buses, and trams.

Prior Solutions

Currently available products have a maximum of 2 LTE antennas and possibly a GNSS patch antenna per unit. What is needed is an antenna configuration with four LTE antennas, two Wi-Fi antennas and a GNSS patch antenna solution.

SUMMARY

The disclosed 7 in 1 antenna is configured with 4 standard M10 holes that allows for easy retro-fit into existing installation holes that may be present. The housing includes up to seven separate antenna components positioned within the housing, any two or more antenna components may be isolated from each other.

An aspect of the disclosure is directed to antennas comprising: a housing having a bottom component and a top component; a plurality of antenna elements comprising a WiFi antenna, an LTE antenna positioned within the housing; a GPS/GLONASS/BeiDou patch positioned within the housing on an M-shaped structure; and one or more isolation plates positioned within the housing between two or more antenna elements. In some configurations, top component has a curved upper surface and a length greater than a width. The top component can also have a recess on each side of the top component along its length. The bottom component can be configurable so that the bottom component is substantially planar with a length greater than a width. A plurality of anchoring members can be provided. The anchoring members can be used to secure the housing to, for example, a moveable device such as a vehicle, street car or railroad car. Suitable anchoring members can be bolts. A gasket can also be provided between the top and bottom portion of the housing and/or between the antenna housing and the moveable device. The antenna elements can be arranged so that the WiFi antenna is adjacent a first LTE antenna and the first LTE antenna is adjacent a second LTE antenna. In at least some configurations, the GPS/GLONASS/Beidou patch is positioned between two LTE antennas. The GPS/GLONASS/Beidou patch can be centrally positioned within the housing along its length. The antenna elements can be arranged in an order from a first side to a second side where a first WiFi antenna is adjacent a first LTE antenna which is adjacent a second LTE antenna, which is adjacent the GPS/GLONASS/BeiDou patch which is adjacent a third LTE antenna which is adjacent a fourth LTE antenna which is adjacent a second WiFi antenna.

Still another aspect of the disclosure is directed to a method of multi-antenna communicating comprising: providing an antenna housing having a bottom component and a top component; a plurality of antenna elements comprising a WiFi antenna, an LTE antenna positioned within the housing; a GPS/GLONASS/BeiDou patch positioned within the housing on an M-shaped structure; and one or more isolation plates positioned within the housing between two or more antenna elements; positioning the plurality of antenna elements so that the WiFi antenna is adjacent a first LTE antenna and the first LTE antenna is adjacent a second LTE antenna; and securing the antenna housing to a surface of a moveable device.

INCORPORATION BY REFERENCE

All publications, patents, and patent applications mentioned in this specification are herein incorporated by reference to the same extent as if each individual publication, patent, or patent application was specifically and individually indicated to be incorporated by reference. See, Train-to-Ground Communication (Huber+Suhner) December 2015;

SENCITY® Roof-top antenna for trains (Huber+Suhner) October 2015;

TRNBG-TET Train Antenna (Panorama Antennas) March 2016;

MiMo Rooftop Antenna DataSheet (TE Connectivity) March 2016;

Train Antenna 790-2700 (Kathrein);

Train Antenna 1710-3800 (Kathrein); and

Train Antenna 410-470 (Kathrein).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3 is a side view of a housing along a long axis for the antenna configurations according to the disclosure;

FIG. 4 is a side view of a housing along a short axis for the antenna configurations according to the disclosure;

DETAILED DESCRIPTION

Figure 1:
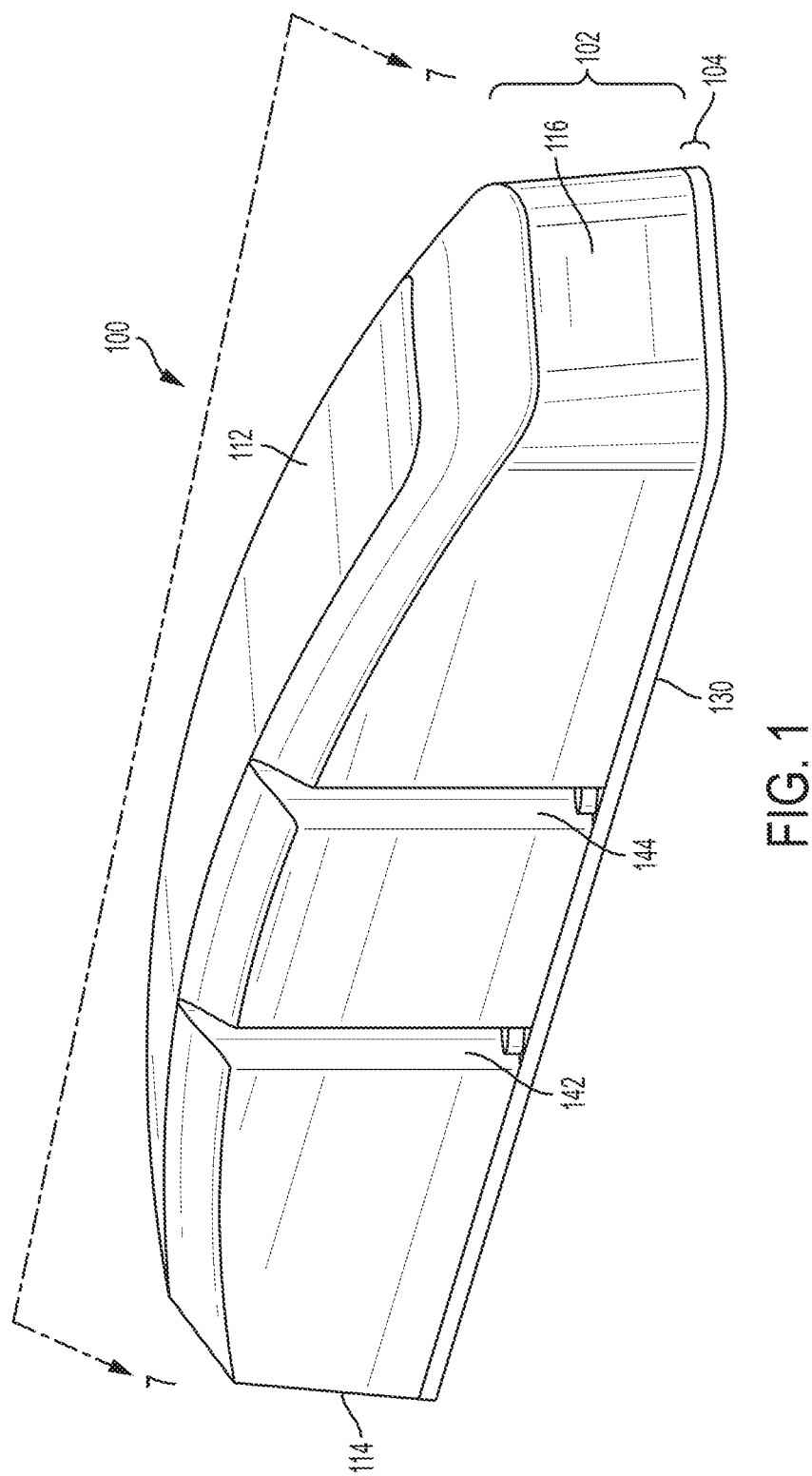
FIG. 1 is a top perspective view of a housing for the antenna configurations according to the disclosure.
Figure 2:
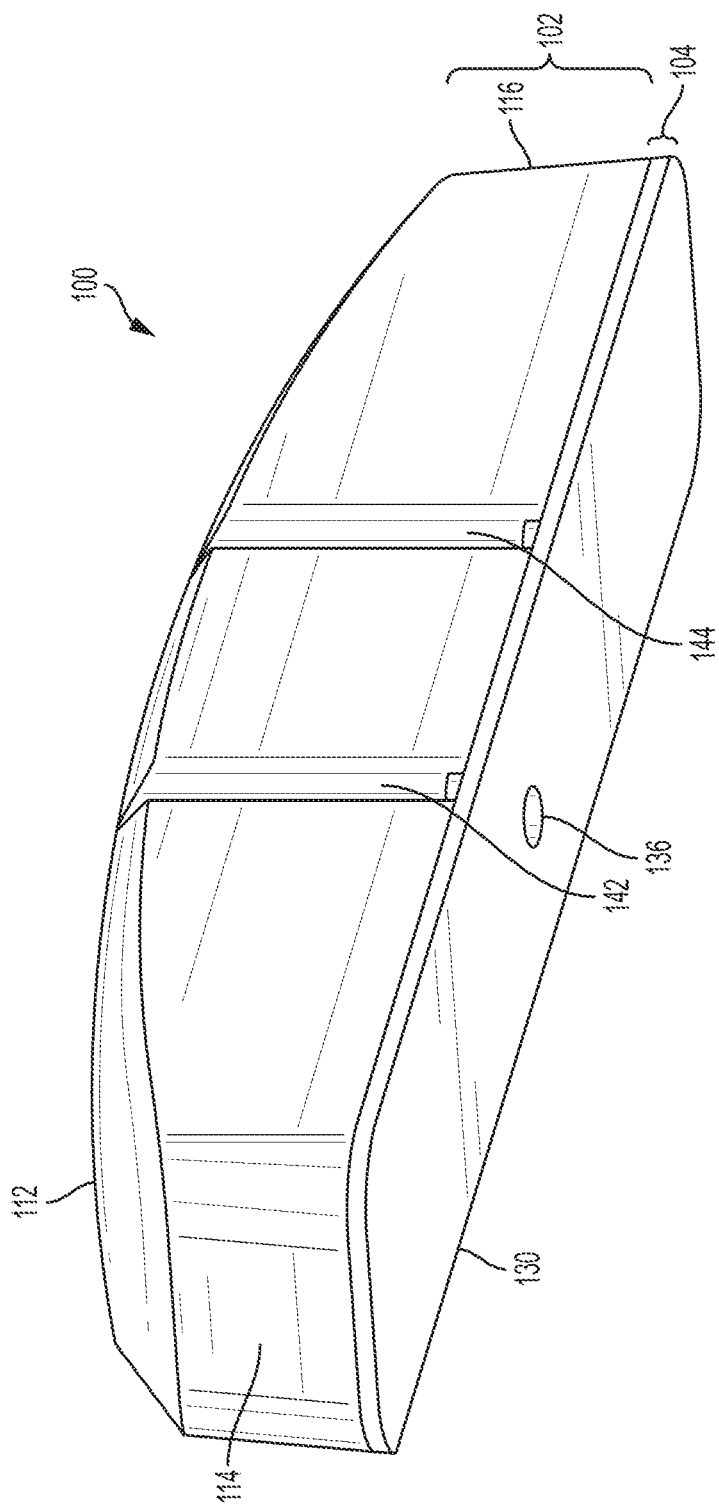
FIG. 2 is a bottom perspective view of a housing for the antenna configurations according to the disclosure.
Figure 5:
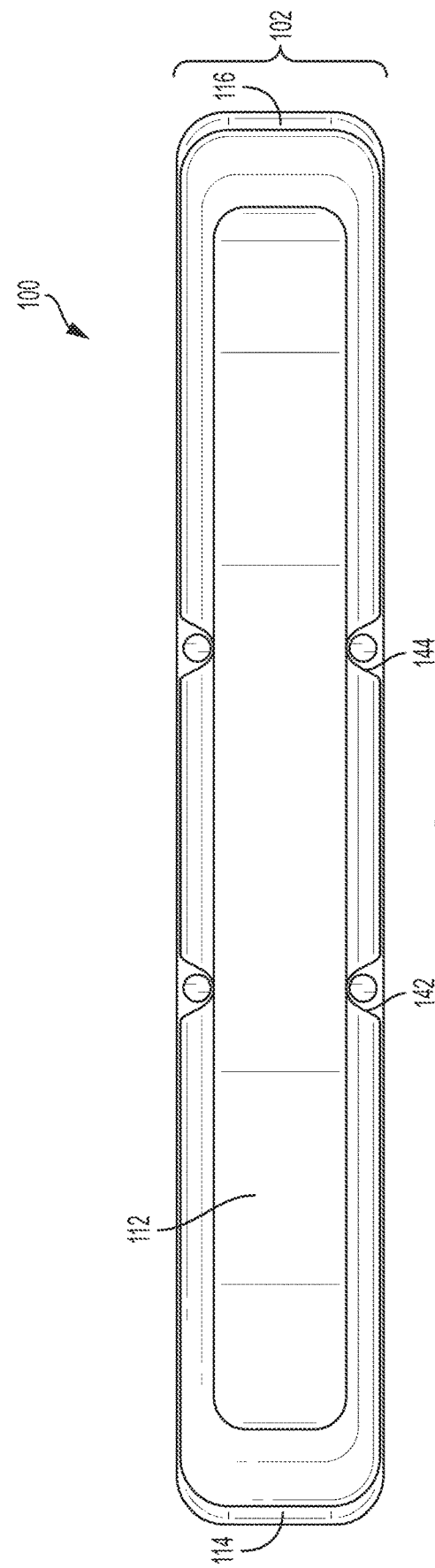
FIG. 5 is a top view of a housing for the antenna configurations according to the disclosure.

As shown in FIGS. 1-7, an antenna housing 100 is provided which houses up to seven separate antennas within an interior of the antenna housing 100. The antenna housing can be a two-piece design, with a top cover or upper portion 102 which securely mates with a bottom plate or lower portion 104. The antenna housing 100 is configurable to have a plurality of exterior surfaces. The upper portion 102 has a front face 110, an upper face 112, a first side face 114, a second side face 116, and a rear face 118. The upper face 112 can be slightly arcuate, as shown in FIGS. 1 and 3, with the first side face 114 and second side face 116 extending from the upper face 112 at an angle towards a planar or substantially planar bottom surface 130 of the lower portion 104.

The antenna housing 100 has a length along a long axis of from 600 mm to 800 mm, a width of from 80 mm to 120 mm, and a height of from 100 mm to 125 mm and may be curved along an upper surface (shown in FIGS. 1 and 3) such that the height at a first end and a second end is less than a height at a midpoint along its long axis. FIGS. 3-4 illustrates a side view of the antenna housing 100 shown in FIGS. 1-2 along a long axis (FIG. 3) and a short axis (FIG. 4). The sides of the antenna housing 100 curve down from an upper face 112 towards an edge that meets the lower portion 104.

The antenna housing 100 is constructed of material which provides both strength and protection from environmental elements. Suitable material includes, for example, polycarbonate resin which as LEXAN®. Other materials may be used as desirable without departing from the scope of the disclosure. The antenna housing 100 may have a two-piece construction as illustrated with an upper member 102 (e.g., formed from LEXAN) and a lower member 104 or base. The base can be formed from, for example, an aluminum alloy. Use of aluminum allow provides protection from abrasion and corrosion. As illustrated a pair of indents 142, 144 are provided along the length of the upper member 102 which allow access to a securement, such as bolts, which secure the antenna housing 100 to the underlying device (e.g., tram or train roof). A pair of indents 142, 144 can be provided on both sides of upper portion 102 of the antenna housing 100 so that a total of four idents are provided (two on each side). In other configurations, a single indent can be provided on each side.

Figure 6:
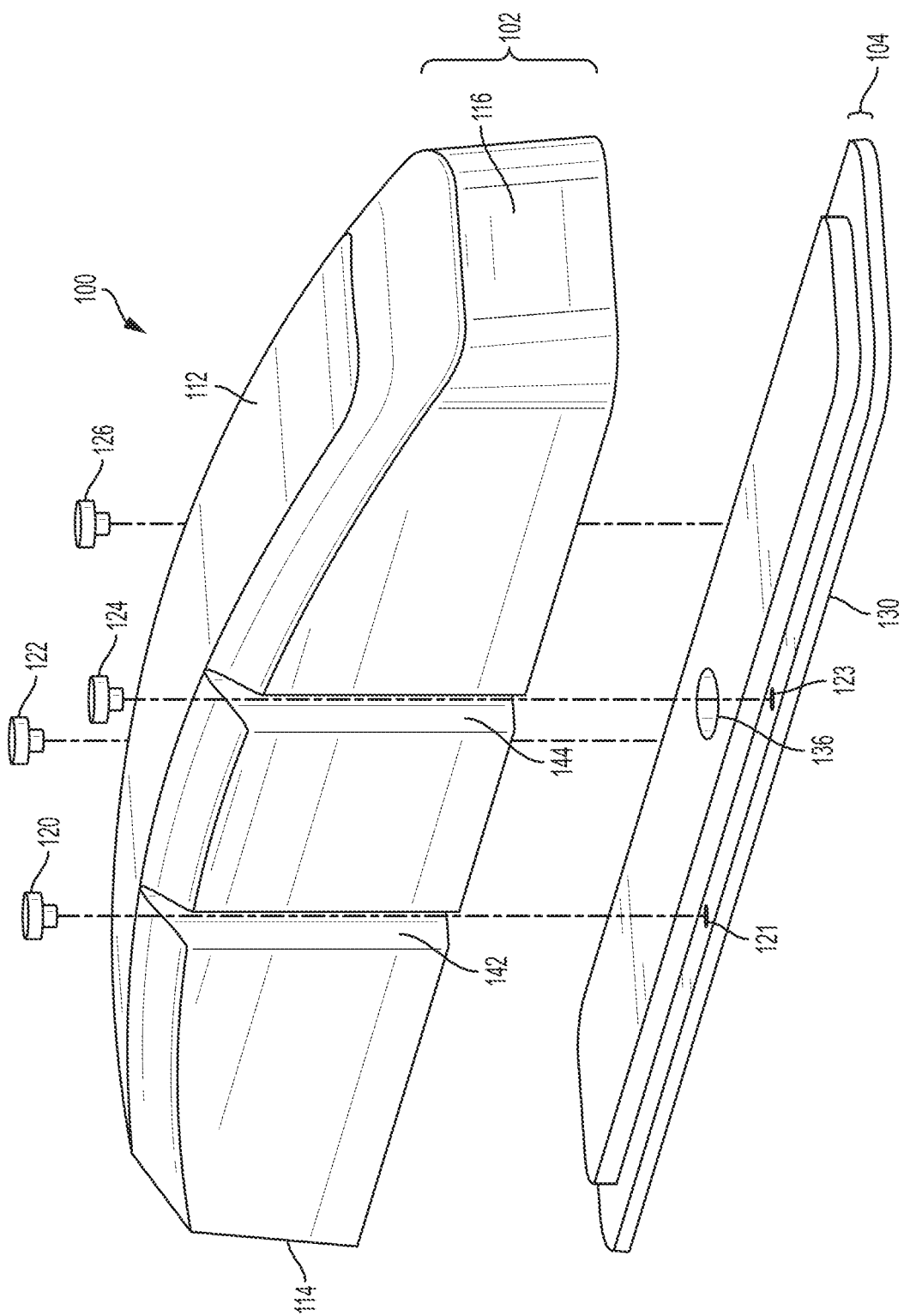
FIG. 6 is an exploded view of the housing showing the interior.

As appreciated from the exploded view in FIG. 6, one or more N-type socket connectors 120, 122, 124, 126 can be provided to secure the antenna housing 100 to the surface of a target (e.g., bus, tram or train) through a corresponding M10 aperture 121, 123. Additionally, a sealing gasket (not shown) may be provided on the lower surface of the antenna housing 100 and/or between the upper portion 102 and the lower portion 104 of the housing 100. Washers (not shown) may also be provided. The antenna housing 100 can also be grounded.

The lower member 104 can have an exterior thickness that is less than a thickness along the remainder of the lower member 104, thereby forming a lip 105. The upper member 102 can then be seated so that a portion of the interior sides of the upper member 102 engage a side of a thicker portion of the lower member 104 and the lower surface of the sides sits on top of the upper surface of the lip 105 of the lower member 104.

Figure 7:
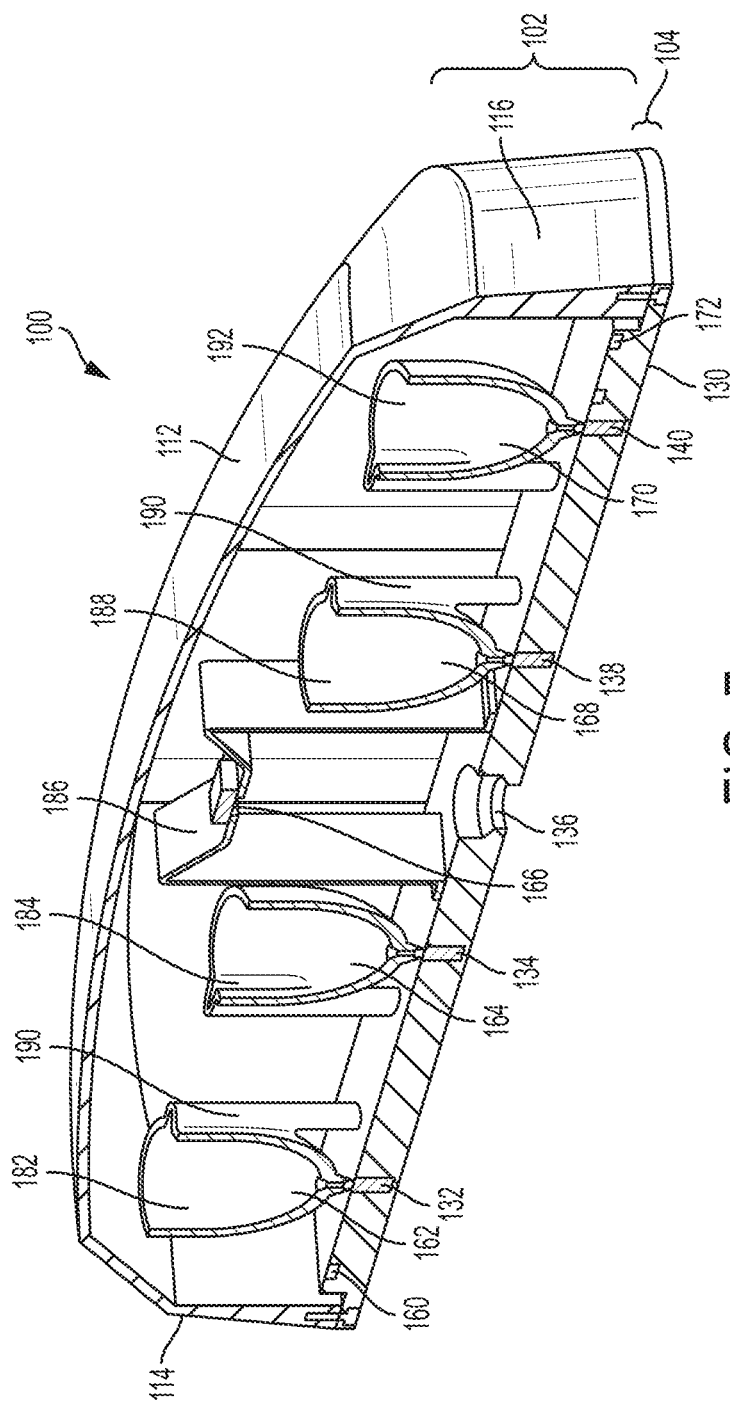
FIG. 7 is a cut-away interior view of a housing for an antenna configuration according to the disclosure.

The disclosed four Long Term Evolution (LTE) Multiple In Multiple Out (MIMO) antenna assembly allows for the use of one, two, or four service providers simultaneously as illustrated in FIG. 7. The antenna design is configurable to also cover legacy 2G and 3G bands for devices that fallback where 4G is unavailable. Additionally, the antennas are configured to provide the highest isolation between the same elements, for example, the two center MIMO antennas are configured to prevent self-interference. Two Wi-Fi antennas are provided at either end of the housing and a GPS/GLONASS/BeiDou patch is provided in the center. The position and orientation of the antennas as shown achieves an optimized performance. The antennas can be arranged from the first side face 114 to the second side face 116 to include a first WiFi antenna 160 positioned within the planar bottom surface 130 and facing into an interior of the housing, a first LTE antenna 162 extending from the planar bottom surface 130 into the interior of the housing having an interior surface 182 and a mounting post, a second LTE antenna 164 extending from the planar bottom surface 130 into the interior of the housing with an interior surface 184, a GPS/GLONASS/BeiDou patch 166 positioned on an M shaped mounting plate 186, a third LTE antenna 168 extending from the planar bottom surface 130 into the interior of the housing with an interior surface 188, a fourth LTE antenna 170 extending from the planar bottom surface 130 into the interior of the housing with an interior surface 192, and a second WiFi antenna 172 positioned within the planar bottom surface 130 and facing into an interior of the housing. Positioning the antenna elements within the interior housing as illustrated in FIG. 7 enables optimal performance from each of the antennas as a result of a high degree of isolation between the same technology elements. Feeding connectors 132, 134, 138, 140 are provided from antenna elements. The feeding connectors 132, 134, 138, 140 connect to a feeding cable which passes through aperture 136. The feeding cable (not shown) connects the antenna elements to electronics in the underlying rail car, for example. Additionally, one or more isolation plates 190 can be provided internally within the antenna housing 100 to isolate one antenna element from another antenna element. A variety of connectors can be used to connect to the antenna, including but not limited to RA SMA connectors. As will be appreciated, other connectors can be used without departing from the scope of the disclosure. The feedthrough is not illustrated. However, one or more cable feedthroughs can be provided, as desired.

An advantage of the design of the disclosures is a reduction in the number of installations required. The disclosed configuration with 4 LTE antennas, provides for only one installation on the roof of, for example, a rail carriage to provide a single antenna with seven separate frequency ranges having a wide variety of frequency coverage. In operation, the antenna can operate in two or more multiple frequencies simultaneously. In some embodiments, the antenna can operate in all seven at the same time.

As will be appreciated by those skilled in the art, LTE 4G applications demand high speed data uplink and downlink. High efficiency and high gain MIMO antennas are necessary to achieve the required signal-to-noise ratio and throughput required to solve these challenges. The additional Wi-Fi antennas would allow for inter carriage communication, usually primarily for security applications.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An antenna comprising:
   a housing, the housing having a bottom component and a top component;
   a plurality of antenna elements positioned within the housing, the plurality of antenna elements comprising a WiFi antenna, a Long-Term Evolution (LTE) antenna positioned within the housing;

a global navigation satellite system patch positioned within the housing on supporting structure, the supporting structure including a depressed mounting section supporting the global satellite system patch, a first leg extending from a first side of the depressed mounting section, and a second leg extending from a second side of the depressed mounting section opposite the first side; and one or more isolation plates positioned within the housing between two or more antenna elements.

2. The antenna of claim 1 wherein the top component has a curved upper surface and a length greater than a width.

3. The antenna of claim 2 wherein the top component has a recess on each side of the top component along its length.

4. The antenna of claim 1 wherein the bottom component is substantially planar with a length greater than a width.

5. The antenna of claim 1 further comprising a plurality of anchoring members.

6. The antenna of claim 5 wherein the anchoring members are bolts.

7. The antenna of claim 1 further comprising a gasket.

8. The antenna of claim 1 wherein the antenna elements are arranged so that the WiFi antenna is adjacent a first LTE antenna and the first LTE antenna is adjacent a second LTE antenna.

9. The antenna of claim 1, wherein the global navigation satellite system patch is positioned between two LTE antennas.

10. The antenna of claim 1, wherein the global navigation satellite system patch is centrally positioned within the housing along its length.

11. The antenna of claim 1 wherein the plurality of antenna elements are arranged with a first LTE antenna located between a first WiFi antenna, and a second LTE antenna, the global navigation satellite system patch located between the second LTE antenna and a third LTE antenna, and a fourth LTE antenna located between the third LTE antenna and a second WiFi antenna.

12. A method of multi-antenna communicating comprising:

providing an antenna housing having a bottom component and a top component;

positioning a plurality of antenna elements within the housing, the plurality of antenna elements comprising a WiFi antenna, a first Long-Term Evolution LTE antenna adjacent the WiFi antenna, and a second LTE antenna adjacent the first LTE antenna;

positioning a global navigation satellite system patch within the housing supporting structure, the supporting structure including a depressed mounting section supporting the global satellite system patch, a first leg extending from a first side of the depressed mounting section, and a second leg extending from a second side of the depressed mounting section opposite the first side; and positioning one or more isolation plates within the housing between two or more antenna elements.

13. The method of claim 12, additionally comprising securing the antenna housing to a surface of a moveable device.

14. An antenna comprising:

a housing, the housing having a bottom component and a top component;

a plurality of antenna elements positioned within the housing, the plurality of antenna elements comprising a WiFi antenna and a Long-Term Evolution (LTE) antenna positioned within the housing;

a global navigation satellite system patch positioned within the housing on a mounting plate, the mounting plate including a central concavity supporting the global satellite system patch, a first leg extending from a first side of the concavity, and a second leg extending from a second side of the concavity opposite the first side; and an isolation plate positioned within the housing between two of the plurality of antenna elements.

15. The antenna of claim 14, wherein the top component has a curved upper surface and a length greater than a width.

16. The antenna of claim 14, wherein the global navigation satellite system patch is centrally positioned along a length of the housing.

17. The antenna of claim 14, wherein the LTE antenna is located between the WiFi antenna and a second LTE antenna.

18. The antenna of claim 14 wherein the plurality of antenna elements are arranged with the LTE antenna located between the WiFi antenna and a second LTE antenna, the global navigation satellite system patch, located between the second LTE antenna and a third LTE antenna, and a fourth LTE antenna located between the third LTE antenna and a second WiFi antenna.

19. The antenna of claim 14, wherein a distance between the WiFi antenna and the global navigation satellite system patch is greater than a distance between the LTE antenna and the global navigation satellite system patch.

20. The antenna of claim 14, wherein a depth of the concavity in the mounting plate is greater than a height of the global navigation satellite system patch.

* * * * *